United States Patent
Li et al.

(10) Patent No.: US 10,421,873 B2
(45) Date of Patent: Sep. 24, 2019

(54) METHOD FOR IN-SITE SYNTHESIS OF TRANSPARENT CONDUCTIVE COATING OF POLY(3,4-ETHYLENEDIOXYTHIOPHENE)/NANO SILVER

(71) Applicant: SOUTH CHINA UNIVERSITY OF TECHNOLOGY, Guangzhou (CN)

(72) Inventors: Jianxiong Li, Guangzhou (CN); Yaxiao Ma, Guangzhou (CN); Anhua Liu, Guangzhou (CN)

( * ) Notice: Subject to any disclaimer, the term of this patent is extended or adjusted under 35 U.S.C. 154(b) by 0 days.

(21) Appl. No.: 15/822,257

(22) Filed: Nov. 27, 2017

(65) Prior Publication Data

US 2018/0072896 A1 Mar. 15, 2018

Related U.S. Application Data

(63) Continuation of application No. PCT/CN2015/100040, filed on Dec. 31, 2015.

(30) Foreign Application Priority Data

May 25, 2015 (CN) .......................... 2015 1 0269149

(51) Int. Cl.
| | | |
|---|---|---|
| B05D 1/18 | (2006.01) | |
| B05D 3/00 | (2006.01) | |
| B05D 3/06 | (2006.01) | |
| B05D 3/10 | (2006.01) | |
| C09D 5/24 | (2006.01) | |
| B22F 9/24 | (2006.01) | |
| C08J 5/24 | (2006.01) | |
| C08J 7/04 | (2006.01) | |
| C08K 3/08 | (2006.01) | |
| C09D 181/02 | (2006.01) | |
| H01B 1/12 | (2006.01) | |
| C09D 7/61 | (2018.01) | |
| C09D 7/65 | (2018.01) | |
| C08G 61/12 | (2006.01) | |

(52) U.S. Cl.
CPC .................. *C09D 5/24* (2013.01); *B05D 1/18* (2013.01); *B05D 3/007* (2013.01); *B05D 3/063* (2013.01); *B05D 3/101* (2013.01); *B05D 3/104* (2013.01); *B22F 9/24* (2013.01); *C08G 61/126* (2013.01); *C08J 5/24* (2013.01); *C08J 7/047* (2013.01); *C08K 3/08* (2013.01); *C09D 7/61* (2018.01); *C09D 7/65* (2018.01); *C09D 181/02* (2013.01); *H01B 1/128* (2013.01); *C08G 2261/1424* (2013.01); *C08G 2261/3223* (2013.01); *C08G 2261/964* (2013.01); *C08J 2367/02* (2013.01); *C08K 2003/0806* (2013.01); *C08K 2201/001* (2013.01)

(58) Field of Classification Search
CPC . B05D 1/18; B05D 1/00; B05D 3/007; B05D 3/06; B05D 3/061; B05D 3/062; B05D 3/063
See application file for complete search history.

(56) References Cited

U.S. PATENT DOCUMENTS

| | | | |
|---|---|---|---|
| 8,094,247 B2 | 1/2012 | Allemand et al. | |
| 8,421,231 B2 | 4/2013 | Ho et al. | |
| 2003/0211331 A1* | 11/2003 | Louwet | C08G 61/126 428/419 |
| 2005/0202251 A1 | 9/2005 | Elschner et al. | |
| 2011/0175036 A1* | 7/2011 | Masahiro | C08J 7/047 252/500 |

OTHER PUBLICATIONS

Zhang, Preparation of PEDOT film by liquid phase depositional polymerization, 2013, Polymer Materials Science & Engineering, Issue 4, p. 129-132 (Year: 2013).*
Park, One-pot synthesis of silver nanoparticles decorated poly(3,4-ethylenedioxythiophene, 2012, Journal of Materials Chemistry, 22, p. 1521-1526 (Year: 2012).*
International Search Report of PCT/CN2015/100040, dated Apr. 1, 2016.

* cited by examiner

*Primary Examiner* — Dah-Wei D. Yuan
*Assistant Examiner* — Nga Leung V Law
(74) *Attorney, Agent, or Firm* — Erson IP (Nelson IP)

(57) ABSTRACT

A method for in-site synthesis of transparent conductive coating of poly(3,4-ethylenedioxythiophene)/nano silver hybrid on transparent substrate is provided. Transparent substrate with oxidant coating containing silver salt is immersed into 3,4-ethylenedioxythiophene (EDOT) solution. The oxidant turns EDOT monomer to poly(3,4-ethylenedioxythiophene) (PEDOT) coating on the transparent substrate; meanwhile, the silver salt itself is reduced to nano silver by the EDOT monomer, resulting in a nano silver-doped PEDOT coating. Thereby, a transparent conductive film made of PEDOT/nano silver coating on transparent substrate is obtained. The transparent conductive film with PEDOT/nano silver coating prepared in the present invention possesses the advantages of high electrical conductivity, optical transparency and environmental stability.

9 Claims, No Drawings

METHOD FOR IN-SITE SYNTHESIS OF TRANSPARENT CONDUCTIVE COATING OF POLY(3,4-ETHYLENEDIOXYTHIOPHENE)/NANO SILVER

CROSS-REFERENCE TO RELATED APPLICATIONS

This application is a continuation of International Patent Application No. PCT/CN2015/100040 with a filing date of Dec. 31, 2015, designating the United States, now pending, and further claims priority to Chinese Patent Application No. 201510269149.4 with a filing date of May 25, 2015. The content of the aforementioned applications, including any intervening amendments thereto, are incorporated herein by reference.

FIELD OF THE INVENTION

The present invention relates to the technical field of flexible transparent conductive films, and particularly relates to a method for in-site synthesis of transparent conductive coating of poly(3,4-ethylenedioxythiophene)/nano silver hybrid on a transparent substrate.

BACKGROUND OF THE INVENTION

Flexible transparent conductive film is one of critical materials for flexible optoelectronic devices, such as flexible display panels, touch control panels, electronic papers, solar cells and the like. At present, the commercial flexible transparent conductive film is mainly a composite film formed by sputtering indium tin oxide (ITO) compound on a transparent polymer film. On one hand, indium is a precious metal, which belongs to scarce resource; and on the other hand, ITO film has high brittleness and poor flexibility, and the ITO-based transparent conductive film has short bending fatigue life and can hardly meet the requirements to optoelectronic development. Many institutions and companies work on developing flexible transparent conductive films free of ITO.

When the thicknesses of metal films, such as silver, gold, aluminum and the like, are less than 20 nm, the metal films are still electrical conductive. But the electrical conductivity of the metal films decreased with the decrease of the thickness, while absorption and reflection of visible light decreased sharply, so that the nano metal film may present certain light transmission and electrical conductivity. However, the cost to fabricate nano metal films on polymers is very high, hence, the flexible transparent conductive nano metal film is difficult to be produced in large scale and commercialized. It is another choice to prepare flexible transparent conducive films by forming a conductive network of metal nanowires or metal nanoparticles. ClearOhm technology is to prepare silver nanowire and silver nanowire ink, which was developed by Cambrios company in America in 2008 and was used to fabricate flexible transparent conducive films. The silver wire has a diameter of about 100 nm, and an aspect ratio greater than 300. The silver nanowire ink was coated on a transparent polymer film, and the silver nanowires in random orientation form a conductive network. The sheet resistance of the obtained flexible films can be 50-300Ω/□ and the light transmittance is about 92%. The key to this technology is controlling the distribution of the metal nanowires on the substrate to form conductive paths. In order to promote the application of silver nanowire ink on touch control panels, Cambrios and others investigated the feasibility of patterning the FTCF with silver nanowire networks, such as by laser ablation technique.

Poly(3,4-ethylenedioxythiophene)(PEDOT) is an intrinsic conducting polymer with excellent electrical conductivity, optical transparency and environmental stability. It is a good candidate to replace ITO in flexible transparent conducive films. However, PEDOT is insoluble and infusible. It can hardly be processed into a thin film. The aqueous dispersion of PEDOT and polystyrenesulfonate (PSS) complex, i.e., Baytron P developed by Bayer A G, may be coated in thin film, thereby solve the problem of forming PEDOT film in a certain degree. However, the insulated PSS layer hinders charge migration; the electrical conductivity of PEDOT/PSS film is low; also, the moisture absorption of PSS component is high. The electrical conductivity and reliability of the PEDOT/PSS film cannot meet the market requirements. Many researchers investigate in-site polymerization of EDOT monomers on substrates to solve the film-forming problem and obtain transparent PEDOT film with higher electrical conductivity and stability. The explored methods include direct polymerization, adsorption in polymerizing solution, chemical vapor deposition (CVD), vapor phase polymerization (VPP) and liquid phase depositional polymerization (LPDP).

The method of direct polymerization comprises the steps: mixing 3,4-ethylenedioxythiophene (EDOT) monomer and oxidant solutions together, then coating the mixture on a substrate and finally heating it for chemical oxidative polymerization of the monomer. In the direct polymerization, almost no solvent remained in the middle period of the reaction, hence it is difficult for EDOT oligomers to move and join each other; the obtained PEDOT have low polymerization degree and poor regularity. The electrical conductivity of the obtained PEDOT films can approach 100 S/cm. Moreover, once the monomer and oxidant solution are mixed, the chemical oxidative polymerization is started. Although retardants, such as imidazole and other organic bases, may prolong the pot life of the mixture, the repeatability of the experiment is extremely poor and the electrical conductivity may fluctuate in several magnitudes.

The method of adsorption in polymerizing solution comprises the steps: laying a substrate in the bottom of EDOT monomer solution; and adding oxidant solution for chemical oxidative polymerization; thus, same synthesized PEDOT molecules coalesce in the solution and are deposited on the substrate to form a PEDOT coating. The PEDOT film obtained by this method is low in compactness and adhesion. Also, the utilization of monomer is extreme low. Though sulfonic groups grafted on substrates can increase the adhesion of the PEDOT film, other drawbacks remain still.

The method of chemical vapor deposition (CVD) comprises the steps: loading a substrate in a reaction chamber and simultaneously introducing oxidant and monomer vapors into the reaction chamber. The monomer and oxidant vapors deposit on the substrate and oxidative polymerize. After washing off the oxidant residues and EDOT oligomers, transparent PEDOT film with electrical conductivity above 1000 S/cm can be prepared. However, special equipment is needed for CVD; also, the operation requirement is high; and the types of optional oxidants are limited. CVD is unsuitable for production in large-scale.

The method of vapor phase polymerization (VPP) comprises the steps: pre-forming an oxidant coating on substrate and exposing the substrate with oxidant coating to monomer vapor. The monomer vapors deposit on the oxidant coating continually and polymerize in situ. Kim et al exposed a PET film with $FeCl_3$ and surfactant to EDOT vapor. As monomer vapor deposited on the PET film and polymerized to form PEDOT film, thereby, transparent PET composite film with sheet resistance of 500Ω/☐ was prepared. The acidity of solid ferric salt oxidant is high enough to catalyze the side reactions of addition polymerization of EDOT, resulting in conjugative defects in the PEDOT chains and nonconductive products. The side reactions may be inhibited by doping volatile organic bases into the oxidant. Also, in VPP, moisture does benefit the deprotonation of cationic EDOT dimers and construct conjugative PEDOT molecules. However, moisture will stimulate the hydration, and crystallization of ferric salt oxidants and reduce the reactive activity of oxidants. This may lead to pinholes on the synthesized PEDOT film. In VPP, only chamber humidity, oxidant formula and reaction conditions are controlled tightly, high quality PEDOT coating could be produced.

The method of liquid phase depositional polymerization is suspending substrate with oxidant coating in EDOT solution to synthesize PEDOT coating in-situ, in order to overcome the drawbacks of VPP, Li et al suspended substrates with oxidant coating in EDOT solution and PEDOT coating was synthesized on the substrate in situ. Furthermore, they introduced peroxy acid into the surface of the substrate as second oxidant to solve the problem of ferric salt loss at high concentration and enhance the efficiency of coated ferric salt oxidant.

In order to improve the electrical conductivity of PEDOT coating, some researchers combined the nano silver with PEDOT coating. They added silver nanowires or silver nanoparticles into PEDOT/PSS dispersion so as to prepare a PEDOT/nano silver hybrid film.

As mentioned above, at present, commercial flexible transparent conductive films mainly refer to polymeric films with ITO coating; they have high price and poor bending resistance. Non-ITO substitutes are being investigated. Particularly, conducting PEDOT films and silver nanowire ink have high competitiveness and ability to market penetration. The present invention provides a technology for in-site synthesis of transparent conductive PEDOT/nano silver coating on transparent substrates and a method for fabricating flexible transparent conductive film.

SUMMARY OF THE INVENTION

To overcome the drawbacks in the prior art, the present invention provides a method for in-site synthesis of transparent conducive coating of PEDOT/nano silver hybrid on a transparent substrate, so as to improve the optoelectronic properties of PEDOT coating and fabricate flexible transparent conductive films with high quality.

The objective of the present invention is realized through a technical solution as follows:

A method for in-site synthesis of transparent conductive coating of PEDOT/nano silver hybrid comprises: synthesizing conducting PEDOT and nano silver simultaneously by liquid-phase oxidation-reduction, and in-site synthesizing transparent conductive coating of PEDOT/nano silver hybrids on transparent substrates simultaneously.

Further preferably, the above method comprises: immersing transparent substrate with oxidant coating containing silver salt and other oxidants into EDOT solution, wherein on the transparent substrate, the oxidant coating containing silver salt and other oxidants will turn EDOT to transparent conductive coating of PEDOT by chemical oxidative polymerization; meanwhile, the EDOT will turn the silver salt to metal silver by chemical reduction, resulting in the coating of PEDOT/nano silver hybrid on the transparent substrate.

Further preferably, the silver salt can be silver p-toluenesulfonate or silver nitrate or a mixture of silver p-toluenesulfonate and silver nitrate. The molar percent of the silver salt in the oxidant coating is 50-100%; and the other oxidants in the oxidant coating contain ferric salt. The content of the oxidant coating on a surface of the transparent substrate is 0.5-10 mmol/m$^2$.

Further preferably, the 3,4-ethylenedioxythiophene solution contains dissolved polyvinylpyrrolidone; the average molecular weight of the polyvinylpyrrolidone is 10000-100000 g/mol; and the mass concentration of the polyvinylpyrrolidone in the 3,4-ethylenedioxythiophene solution is 0.01-2%.

Further preferably, the 3,4-ethylenedioxythiophene solution contains 20-400 mmol/L of 3,4-ethylenedioxythiophene; and the solvent for the 3,4-ethylenedioxythiophene solution is selected at least one from the following solvents: petroleum ether, hexane, heptane, cyclohexane, benzene, methylbenzene, chloroform, acetonitrile, methanol, ethanol and butanol.

Further preferably, the ferric salt can be selected at least one from ferric p-toluenesulfonate, ferric trichloride and ferric sulfate; and the molar percent of the p-toluenesulfonate in the oxidant coating is above 40%.

Further preferably, the PEDOT/nano silver hybrid is synthesized in EDOT solution at temperature 40-80° C.; the time period of the synthesizing reaction is 0.1-2 hours; just after the synthesizing reaction, the resultant PEDOT/nano silver hybrid is immersed in a dilute solution of ferric salt and then cleaned.

Further preferably, the transparent substrate is made of glass, poly(methyl methacrylate), polycarbonate, poly(ethylene terephthalate), poly(ethylene naphthalate), cycloolefin polymers, polyimide, cured epoxy resin or organic silicone resin.

Further preferably, the transparent substrate can be a transparent substrate with preformed conducting PEDOT coating.

Further preferably, the transparent substrate is subjected to surface treatment before coating oxidants; the surface treatment comprises chemical surface modification or vacuum ultraviolet surface modification; the chemical surface modification refers to hydrolysis or sulfonation; and the vacuum ultraviolet surface modification refers to photochemical oxidation with 172 nm vacuum ultraviolet.

Compared with the prior art, the present invention has the following advantages and technical effects:

In the present invention, the β-site of monomer is directly connected with oxygen. The electron-donation of the oxygen atom enhances the electron density on the thiophene ring of the monomer and reduces the oxidation potential of the thiophene ring. The thiophene ring is very easy to be oxidized and polymerized under the effect of ferric oxidants. Moreover, the β-site of the thiophene ring of the monomer are occupied, the monomers can be united only through α-α joint, and the resultant conjugative PEDOT chains possess high regularity, thereby, high electrical conductivity, transparency and stability.

When a transparent substrate with oxidant coating is immersed into EDOT monomer solution, the oxidant dissolve into the stagnant layer over the substrate, and capture the electrons on the thiophene ring make the monomer joining; thus, the EDOT monomer in the stagnant layer convert to dimers, trimers and oligomers gradually. Due to the insolubility of PEDOT, the solubility of the EDOT oligomers decreases with the increase of the polymerization degree, the oligomer is adsorbed and settled onto the substrate. Meanwhile, the EDOT monomers in the solution phase diffuse into the stagnant layer, driven by concentration difference, so as to compensate the consumed EDOT monomer in the stagnant layer. Under the effect of oxidants, the EDOT monomer reacts with the oligomer adsorbed on the substrate continually and produce macromolecular chains, thereby, forming the transparent conductive PEDOT coating on the substrate.

When the substrate with oxidant coating containing silver salt is immersed in EDOT solution, the silver ions capture electrons from the thiophene ring of monomers in the stagnant layer and oxidize the monomer, meanwhile, the silver ions are reduced into silver atoms. The reduced silver atoms are deposited onto the substrate and accumulate to silver crystal nuclei. The silver crystal nuclei adsorb the reduced silver atoms continually and grow up along with the oxidation and polymerization of EDOT, and nano silver is generated on the substrate, thereby enhancing the electrical conductivity of PEDOT coating.

The solubility of silver p-toluenesulfonate and silver nitrate is high, so that silver p-toluenesulfonate and silver nitrate can be conveniently dissolved and coated on substrate for preforming oxidant coating, which is useful for silver salt to dissolve into the stagnant layer and oxidize EDOT monomer. The content of the oxidant coating on the substrate is positively related to the thickness of synthesized PEDOT coating. However, if the content of the oxidant coating is too high, time to dissolve all the oxidant is prolonged. Residual oxidant may affect the adhesion between the PEDOT coating and substrate. For liquid phase depositional polymerization of EDOT, appropriate quantity of the oxidant coating is 0.2-10 mmol/m$^2$. The method of repeating oxidant impregnation and liquid phase depositional polymerization can meet the requirements to the thickness of PEDOT coating.

The <100> plane of silver crystal has high surface energy and high adsorbability. Polyvinylpyrrolidone prefers attaching to the <100> plane of silver crystal. Polyvinylpyrrolidone dissolved in EDOT solution is preferably adsorbed onto the <100> plane of sliver crystals; the adsorbed polyvinylpyrrolidone hinder the deposition of silver atoms and the growth of the <100> plane of silver crystals, consequently, the growth of the <100> plane of silver crystals is depressed and the <111> plane of silver crystals grow faster, thereby, silver needles or silver nanowires are generated. Polyvinylpyrrolidone with molecular weight of 10000-100000 g/mol has good solubility in EDOT solution and high ability to structural adjustment. In EDOT solution, the aspect of growing silver crystals can be adjusted efficiently at 0.01-2% by weight of polyvinylpyrrolidone.

The solvent for EDOT solution affects not only the solubility of EDOT and EDOT oligomers but also the dissolving rate of the coated oxidant and the solvation of the oxidant, EDOT and oligomers. Solubility and solvation capability of EDOT solvent will affect the operation of liquid phase deposition polymerization and the resultant PEDOT chains on the aspects of continuous conjugative length, structural regularity, doping degree and the amount of charge carriers. The higher the quantity of adsorbed oxidant is, the higher the solubility of used solvent is, the faster the oxidant enters the stagnant layer. By selecting mixed solvent from petroleum ether, hexane, heptane, cyclohexane, benzene, methylbenzene, chloroform, acetonitrile, methanol, ethanol or butanol, it can be achieved conveniently for the mixed solvent to match the dissolving rate of oxidant with the consumption rate by chemical oxidative polymerization, so as to prevent the oxidant from going through the stagnant layer and entering the solution phase, thereby, ensure that the chemical oxidative polymerization occurs in the stagnant layer. Meanwhile, the selected mixed solvent may affect the chain structure, doping level and aggregation structure of the synthesized PEDOT, thereby, optimize the electrical conductivity, the optical transmittance and interface adhesion of synthesized PEDOT coating.

The oxidation potential of EDOT is low. The cations of ferric salt, silver salt and some other high-valence metallic salts can capture the electrons on the thiophene ring of EDOT and make EDOT to join each other through chemical oxidative polymerize. Ferric trichloride, ferric sulfate, ferric p-toluenesulfonate are readily available; additionally, the anions of these ferric salts can dope PEDOT and balance the positive charge of oxidized PEDOT chain elements. Therefore, PEDOT coatings synthesized with these ferric oxidant exhibit high electrical conductivity. As the content of adsorbed oxidant coating on transparent substrate is above 0.5 mmol/m transparent film with sheet resistance less than $10^3$ Ω/□ can be prepared by liquid phase depositional polymerization. The thickness of the synthesized PEDOT coating increases with the increase of the quantity of adsorbed oxidant. However, if the quantity is too high, the oxidant is easy to gather into spots on the substrate. The adoption of multiple oxidants may decrease the trend of forming oxidant spots at high total content of oxidants. The anions of p-toluenesulfonate can serve as a doping agent to balance positive charges on oxidized chain elements of PEDOT and increase the doping level, the amount of charge carriers in PEDOT film. The volume of anions of p-toluenesulfonate is moderate, which is beneficial to the conformation adjustment and the package of PEDOT chains as the anions of p-toluenesulfonate serve as the doping countraions of oxidized PEDOT. In mixed oxidant coatings, 40% by molar ratio of the p-toluenesulfonate may ensure that there are enough anions from p-toluenesulfonate to balance the positive charges of synthesized PEDOT.

A coating of PEDOT/nano silver hybrid can be synthesized in-situ on a substrate as the substrate is attached with 0.5-10 mmol/m$^2$ of mixed oxidants and suspended in 20-400 mmol/L of EDOT solution at temperature from 40-80° C. for 0.2-2 hours. However, because the content of active oxidant pieces decreases away from the substrate, the top layer of the PEDOT coating may consist of PEDOT molecules formed under insufficient oxidants. These PEDOT molecules have low molecular weight or low oxidized state. As the hybrid coating is immersed in Fe(OTs)$_3$ solution just after liquid phase depositional polymerization, these EDOT oligomers and low oxidized macromolecules will react with oxidant continually; consequently, the amount of EDOT oligomers will be reduced and the oxidized state of PEDOT will be enhanced, thereby, the optoelectronic properties of the hybrid coating will be improved.

The performance of the obtained flexible transparent conductive composite film is obviously affected by the transparent substrate. Common optical transparent plastics are poly(methyl methacrylate), polycarbonate, poly(ethylene terephthalate), cured epoxy resin, organic silicone resin and the like. Cycloolefin polymer is a newly developed optical transparent plastic with characteristics of low surface energy, low permeability and low moisture absorption, chemical resistance and aging resistance. Poly(ethylene naphthalate) and transparent polyimide is heat-resistant transparent plastics developed specially for optoelectronic products, which have high dimensional stability and reliability. Transparent substrate can be selected from these optical transparent plastics according to the product requirements and target cost.

Normally, optical transparent plastics have low surface energy. Polar oxidants are difficult to spread evenly on these optical plastics. The transparent substrate should be subjected to hydrophilic treatment so as to increase the wetting properties of the oxidant solution on the substrate and improve the uniformity of coated oxidant layers. Polar groups can be introduced into polymeric surface by chemical surface modification, high-energy radiation treatment or surfactant treatment, thereby, the surface energy and wetting ability of the polymer are improved. The chemical surface modification can be realized by hydrolysis or sulfonation in solution, which will introduce carboxyl or sulfonate to the surface. However, chemical surface modification may lead to uneven etching in heterogeneous crystalline polymers. Irradiation with 172 nm vacuum ultraviolet radiation from xenon excimer may enhance the surface energy of polymer but not lead to unvene etching of crystallized substrates. The vacuum ultraviolet may introduce polar groups into polymer surface in a short time without impairing the surface roughness. Organic substrate may change from hydrophobic to hydrophilic in seconds upon irradiation; the water contact angle may be reduced to below 30 degrees and remain the surface roughness intact.

DETAILED DESCRIPTION OF THE EMBODIMENTS

The present invention is further described below in combination with embodiments. However, the present invention is not limited to the embodiments below.

Embodiment 1

The method comprises the following steps:

Mixing ethanol, isopropanol and acetonitrile in a volume ratio of 3:1:1 to prepare an mixed solvent; dissolving ferric p-toluenesulfonate and silver p-toluenesulfonate at a molar ratio of 1:1 in the mixed solvent to prepare 80 mmol/L of oxidant solution; and adding imidazole into the oxidant solution in a molar ratio of 1:20 of imidazole to p-toluenesulfonate;

Adding 0.3% by weight of acetonitrile into cyclohexane to prepare a mixed cyclohexane solvent; dissolving 0.01% by weight of polyvinylpyrrolidone into the mixed cyclohexane solvent; adding EDOT monomer into the mixed cyclohexane solution and agitating it to prepare a 100 mmol/L of EDOT solution; and Laying a PET film 2 mm away from the irradiating window of a 172 nm xenon excimer lamp with output of 8 mW/m$^2$; irradiating the PET film with 172 nm vacuum ultraviolet in atmosphere for 2 minutes and immersing the irradiated PET film into the oxidant solution containing ferric p-toluenesulfonate and silver p-toluenesulfonate for 4 minutes; taking the film out from the oxidant solution and drying it at 45° C. for 2 minutes. PET film with 1.5 mmol/m$^2$ of oxidant coating was prepared. Suspending the PET film with oxidant coating in the EDOT solution prepared above at 60° C. for 30 minutes; taking the film out and immediately inserting the film in 20 mmol/L of ferric p-toluenesulfonate isopropyl alcohol solution at 60° C. for 2 minutes; washing the film with absolute ethyl alcohol and deionized water, and blowing it with nitrogen stream. Thereby, transparent conductive PET film with PEDOT/nano silver hybrid coating was prepared. The optoelectronic properties of the PET composite film were measured: the light transmittance at 550 nm is 85%, and the sheet resistance is 100 Ω/□.

Embodiment 2

The method comprises the following steps:

Mixing ethanol, isopropanol and acetonitrile in a volume ratio of 2:1:2 to prepare a mixed solvent; dissolving ferric p-toluenesulfonate, silver p-toluenesulfonate and silver nitrate at a molar ratio of 1:1:1 into the mixed solvent to prepare 120 mmol/L of oxidant solution containing ferric p-toluenesulfonate, silver p-toluenesulfonate and silver nitrate; and adding imidazole into the oxidant solution in 1:10 molar ratio of imidazole to p-toluenesulfonate and nitrate;

Adding 0.3% by weight of acetonitrile into cyclohexane to prepare a mixed cyclohexane solvent; dissolving 0.01% by weight of polyvinylpyrrolidone in the mixed cyclohexane solvent; and adding EDOT monomer into the mixed cyclohexane solvent and agitating it to prepare 100 mmol/L of EDOT solution; and Laying a PET film 2 mm away from the irradiating window of a 172 nm xenon excimer lamp with output of 8 mW/m$^2$; irradiating the PET film with 172 nm xenon excimer lamp in atmosphere for 2 minutes and immersing the irradiated PET film in the oxidant solution containing ferric p-toluenesulfonate, silver p-toluenesulfonate and silver nitrate for 4 minutes; taking the film out, drying it at 45° C. for 2 minutes. PET film with 1.9 mmol/m$^2$ of oxidant coating was obtained. Suspending the PET film with oxidant coating in the EDOT solution at 60° C. for 40 minutes; taking the film out from the EDOT solution and immediately inserting the film into 20 mmol/L of ferric p-toluenesulfonate isopropyl alcohol solution at 60° C. for 2 minutes; washing the film with absolute ethyl alcohol and deionized water, and blowing it with nitrogen stream. Thereby, PET film with PEDOT/nano silver hybrid coating was prepared. The optoelectronic properties of the PET composite film were measured: the light transmittance at 550 nm is 85%, and the sheet resistance is 80 Ω/□.

Embodiment 3

The method comprises the following steps:

Mixing ethanol, isopropanol and acetonitrile in a volume ratio of 3:1:1 to prepare a mixed solvent; dissolving ferric p-toluenesulfonate and silver p-toluenesulfonate at a molar ratio of 1:1 in the mixed alcohol solvent to prepare 100 mmol/L of oxidant solution containing ferric p-toluenesulfonate and silver p-toluenesulfonate; adding imidazole into the oxidant solution in 1:20 molar ratio of imidazole to p-toluenesulfonate;

Mixing cyclohexane and toluene in a volume ratio of 1:1 to prepare a mixed solvent and adding 1% by weight of acetonitrile into the mixed solvent; dissolving 0.02% by weight of polyvinylpyrrolidone in the mixed solvent; and adding EDOT monomer into the mixed solvent and agitating it to prepare 100 mmol/L of EDOT solution; and Laying a PET film 2 mm away from the irradiating window of a 172 nm xenon excimer lamp with output of 8 mW/m$^2$; irradiating the PET film with 172 nm xenon excimer lamp in atmosphere for 2 minutes; immersing the irradiated PET film into the oxidant solution containing ferric p-toluenesulfonate and silver p-toluenesulfonate for 4 minutes; taking the film out and drying it at 45° C. for 2 minutes. PET film with 1.8 mmol/m$^2$ of oxidant coating was obtained. Suspending the PET film with oxidant coating in the EDOT solution at 70° C. for 20 minutes; taking the film out and immediately inserting the film into 20 mmol/L of ferric p-toluenesulfonate isopropyl alcohol solution at 70° C. for 2 minutes, washing the film with absolute ethyl alcohol and deionized water and blowing it with nitrogen stream. Thereby, PET film with PEDOT/nano silver hybrid coating was prepared. The optoelectronic properties of the PET composite film, were measured: the light transmittance at 550 nm is 88%, and the sheet resistance is 80 Ω/□.

The embodiments above demonstrated that transparent conductive film comprising transparent conductive coating of PEDOT/nano silver hybrid and transparent substrate can be prepared by immersing PET film with silver salt coating in EDOT solution.

The invention described herein is susceptible to variation, modifications and/or additions other than those specifically described and it is to be understood that the invention includes all such variations, modifications and/or additions which fall within the spirit and scope of the above description.

What is claimed is:

1. A method for in-site synthesis of transparent conductive coating of poly(3,4-ethylenedioxythiophene)/nano silver hybrid on a transparent substrate, comprising insite synthesis of poly (3,4-ethylenedioxythiophene) and nano silver on the transparent substrate simultaneously;

immersing the transparent substrate with an oxidant coating containing silver salt and other oxidants into a 3,4-ethylenedioxythiophene solution, wherein on the transparent substrate, the oxidant coating containing silver salt and other oxidants turns the 3,4-ethylenedioxythiophene to a transparent conductive coating of poly(3,4-ethylenedioxythiophene) by chemical oxidative polymerization; meanwhile, the 3.4-ethylenedioxythiophene turns the silver salt to metal silver by chemical reduction, resulting in the transparent conductive coating of poly(3.4-ethylenedioxythiophene)/nano silver hybrid on the transparent substrate.

2. The method according to claim 1, wherein the silver salt, is silver p-tolueuesulfonate or silver nitrate or a mixture of silver p-toluenesulfonate and silver nitrate: and the molar percent of the silver salt in the oxidant coating is 50-100%; the other oxidants in the oxidant coating contain ferric salt; the content of the oxidant coating on a surface of the transparent substrate is 0.5-10 mmol/m².

3. The method according to claim 1, wherein the 3,4-ethylenedioxythiophene solution contains dissolved polyvinylpyrrolidone; the average molecular weight of the polyvinylpyrrolidone is 10000-100000 g/mol; and the mass concentration of the polyvinylpyrrolidone in the 3,4-ethylenedioxythiophene solution is 0.01-2%.

4. The method according to claim 1, wherein the 3,4-ethylenedioxythiophene solution contains 20-400 mmol/C of 3,4-ethylenedioxythiophene; the solvent for the 3,4-ethylenedioxythiophene solution is selected at least one from petroleum ether, hexane, heptane, cyclohexane, benzene, methylbenzene, chloroform, acetonitrile, methanol, ethanol and butanol.

5. The method according to claim 2, wherein the ferric salt is selected at least one from ferric p-toluenesulfonate, ferric trichloride and ferric sulfate; and the molar percent of the p-toluenesulfonate in the oxidant coating is above 40%.

6. The method according to claim 1, wherein the transparent conductive coating of poly(3,4-ethylenedioxythiophene)/nano silver hybrid is synthesized in the 3,4-ethylenedioxythiophene solution at temperature 40-80° C.; the time period of the synthesizing reaction is 0.1-2 hours; just after the synthesizing reaction, the resultant transparent conductive coating of poly(3,4-ethylenedioxythiophene)/nano silver hybrid is immersed in a dilute solution of ferric salt and then cleaned.

7. The method according to claim 1, wherein the transparent substrate is made of glass, poly(methyl methacrylate), polycarbonate, poly(ethylene terephthalate), poly(ethylene naphtholate), cycloolefin polymers, polyimide, cured epoxy resin or organic silicone resin.

8. The method according to claim 1, wherein the transparent substrate is a transparent substrate with a preformed conductive coating of poly(3,4-ethylenedioxythiophene).

9. The method according to claim 1, wherein the transparent substrate is subjected to surface treatment before the oxidant coating is formed; the surface treatment comprises chemical surface modification or vacuum ultraviolet surface modification; the chemical surface modification is hydrolysis or sulfonation; and the vacuum ultraviolet surface modification is photochemical oxidation with 172 nm vacuum ultraviolet.

* * * * *